Dec. 9, 1924. Re. 15,958
W. J. ASHTON
VENDING RACK
Original Filed March 20, 1922
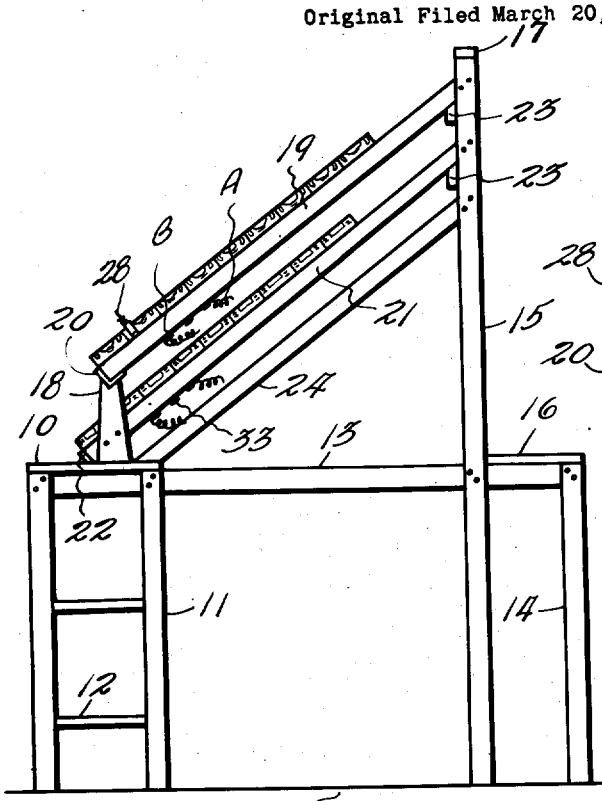
Fig. 1.
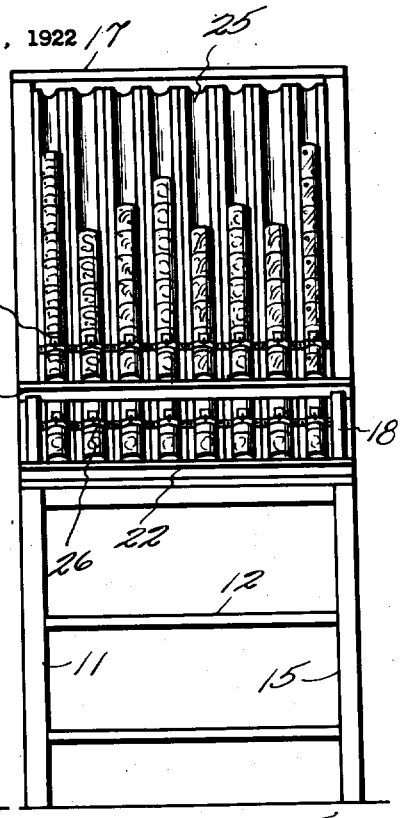
Fig. 2.
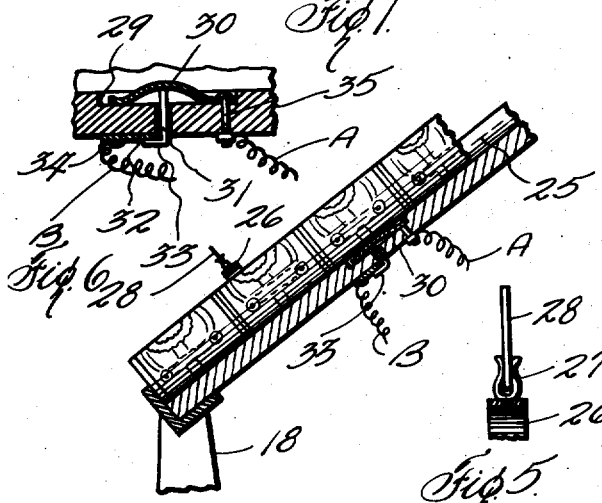
Fig. 6
Fig. 3.
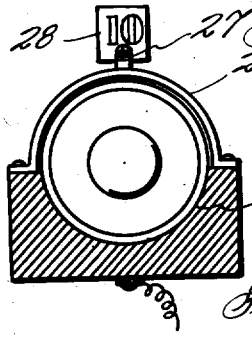
Fig. 4.
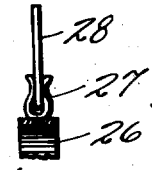
Fig. 5.
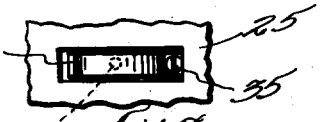
Fig. 7.
INVENTOR.
W. J. Ashton
BY Jack A. Ashley
ATTORNEY.

Reissued Dec. 9, 1924. Re. 15,958

UNITED STATES PATENT OFFICE.

WILLIAM J. ASHTON, OF DALLAS, TEXAS.

VENDING RACK.

Original No. 1,458,510, dated June 12, 1923, Serial No. 544,983, filed March 20, 1922. Application for reissue filed February 29, 1924. Serial No. 696,099.

*To all whom it may concern:*

Be it known that I, WILLIAM J. ASHTON, a citizen of the United States, residing at Dallas, in the county of Dallas and State of Texas, have invented new and useful Improvements in Vending Racks, of which the following is a specification.

This invention relates to new and useful improvements in vending racks.

The object of the invention is to provide in combination with a vending rack having a plurality of inclined channels for containing superimposed packages or cans of merchandise, means arched over the channels for retaining the next to the bottom package or can, when the lowest package or can is lifted from the channel.

A further object is to provide a guard over the channels which may be utilized as a price tag support, owing to the disposition of the guard.

Another object is to provide in combination with the inclined channels a counter for the convenience and aid of the customer; also to provide an elevated platform at the rear for use of the clerk in filling the rack.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a side elevation of a rack constructed in accordance with my invention, Fig. 2 is a front elevation of the same, Fig. 3 is an enlarged partial vertical sectional view, Fig. 4 is an enlarged cross-section on the line 4—4 of Fig. 3, Fig. 5 is a detail of the price tag holder, Fig. 6 is a sectional view showing the electric switch for indicating that the goods need replenishing, and Fig. 7 is a plan view of the same.

In the drawings the numeral 10 designates a counter which is mounted on top of a frame work 11. The counter and frame work may have any desired length and may constitute a unit, several of which may be used. The frame work is provided with shelves 12, on which articles of a fragile nature and other commodities may be stored, which cannot be conveniently handled in the racks. Cross bars 13 have their forward ends secured under the counter and attached to the upper portion of the frame work. These cross bars extend rearwardly and have their rear ends fastened to the upper ends of legs 14.

Posts 15 extend some distance above the bars 13 and are fastened to the latter a short distance from the rear ends thereof. A platform 16 is supported on the bars 13 in rear of the posts 15. A top bar 17 connects the upper ends of the posts whereby a frame or arch is formed above the bars 13. Short standards 18 are mounted at each end of the counter. The upper ends of the standards are notched out to receive the lower end of a display board 19, at the lower end of which is mounted a guard strip 20 extending thereacross. A similar board 21 having a guard strip 22, is mounted between the standards below the first board. These boards are disposed at an inclination and have their upper ends secured within the frame and supported on cross strips 23, attached to the posts 15. Parallel braces 24 extend from the posts 15 down to the counter to lend stability to the rack.

Each board is provided with a plurality of concaved channels or grooves 25 extending in parallel relation from the frame downwardly to the guard strips. These grooves are open at the top so that access may be had thereto from the rear of the frame. The storekeeper mounts the platform 16 and inserts the packages such as canned goods and similar packages in the grooves 25 from the rear. The packages slide down the grooves and fill the same as is shown in the drawings. Near the bottom of each groove is mounted a curved transverse guard 26 which is secured to the board on each side of each channel. These guards are arranged so as to overhang the second package from the bottom of the grooves, and their function is to retain the second package in the groove when the lowermost package is pulled therefrom. It will be seen that if it were not for such an arrangement, that when the lowermost package was lifted from the groove, the next one and perhaps even the next package thereabove, might be dislodged.

On each guard I mount a spring clip 27 in which a price tag 28 may be conveniently displayed. It is pointed out that if desired the boards 19 and 21, may be formed of a plurality of elongated members, each containing a groove 25. These members may be removed and others added or the width of the boards may be varied by adding other members as the occasion may demand.

When the customer removes the lowermost package, the other packages in the same groove will slide down, so that a fresh package is always presented to the purchaser. The storekeeper may replenish the rack from the rear without interfering with the customer or the vending. The goods will be adequately displayed and the stock will be kept moving, thus obviating the chances of the same becoming stale.

In order that the storekeeper may be notified when a certain groove of goods is about to become empty, I provide an electrical enunciating system. In the bottom of each groove I provide a recess 29, in which is mounted a bowed spring member 30 having a plunger 31 secured to its underside and extending through an aperture 32 in the board. The plunger has a laterally bent finger 33 on its lower end adapted to contact with a contact plate 34 fastened on the bottom of the board. The spring member is fastened by a bolt 35 passing through the board and having an electrical circuit wire A attached thereto. A circuit wire B is attached to the contact plate 34 and when the circuit is closed by the engagement of the parts 33 and 34, a suitable signal will be energized as is obvious. It is not considered necessary to either illustrate or describe the character of signal other than to say that it is located at a convenient place so as to be observed by the storekeeper. It will be seen that when an article is in the groove over the member 30 the latter will be depressed so that the contacts 33 and 34, will be separated and the circuit broken. By arranging the member 30 under the third article from the bottom of the groove, it will be seen that as long as there are three articles in the groove no signal will be given, but when the third article is removed and not replaced by one thereabove, the member 30 will spring upwardly, close the circuit and energize the signal. It will be seen that by this arrangement the storekeeper is notified immediately that there are only two articles left in the groove of the rack from which the signal is given, and this will enable him to quickly replenish the stock. Such an arrangement is very important in self service stores in which this device is particularly adapted to be used, although it may be used in stores which employ clerks for serving the customers. It is also obvious that the rack could be used without the signalling system, although it is more efficient with the same. The enunciating system forms no part of the invention herein claimed.

Various changes in the size and construction of the parts as well as modifications, may be made without departing from the spirit of the invention.

What I claim, is:

1. A vending rack comprising a frame structure including a counter and a rear support spaced from and extending above said counter, a plurality of short standards mounted on said counter, an inclined display board having its upper end secured to said rear support and its lower end supported by the said standards, said board having a series of parallel longitudinal grooves, each having a curvature for snugly receiving a plurality of cylindrical articles in superposed order, and an arcuate guard adjacent the lower end of each groove in position to overhang the next to the lowermost article, said guard having means holding a price tag in juxtaposition to the articles in said groove.

2. A vending rack comprising a frame structure including a counter and a rear support spaced from and extending above said counter and an elevated platform behind said support, a plurality of short standards mounted on said counter, an inclined display board having its upper end secured to said rear support and its lower end supported by the said standards, said board having a series of parallel longitudinal grooves, each having a curvature for snugly receiving a plurality of cylindrical articles in superposed order, and an arcuate guard adjacent the lower end of each groove in position to overhang the next to the lowermost article, said guard having means for holding a price tag in juxta-position to the articles in said groove.

3. A vending rack comprising a frame structure including a rear support and a front support of less height than the rear support, an inclined display board having its upper end secured to said rear support and its lower end secured to said front support, said board having a series of parallel longitudinal grooves, each having a curvature for snugly receiving a plurality of cylindrical articles in superposed order, and an arcuate guard adjacent the lower end of each groove in position to overhang the next to the lowermost article, said guard having means holding a price tag in juxtaposition to the articles in said groove.

In testimony whereof I affix my signature.

WILLIAM J. ASHTON.